J. M. WHITING.
Rein-Holder.
No. 63,344.
Patented Mar 26, 1867.
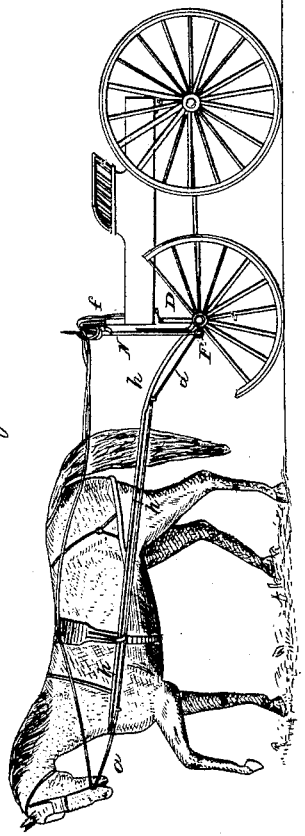
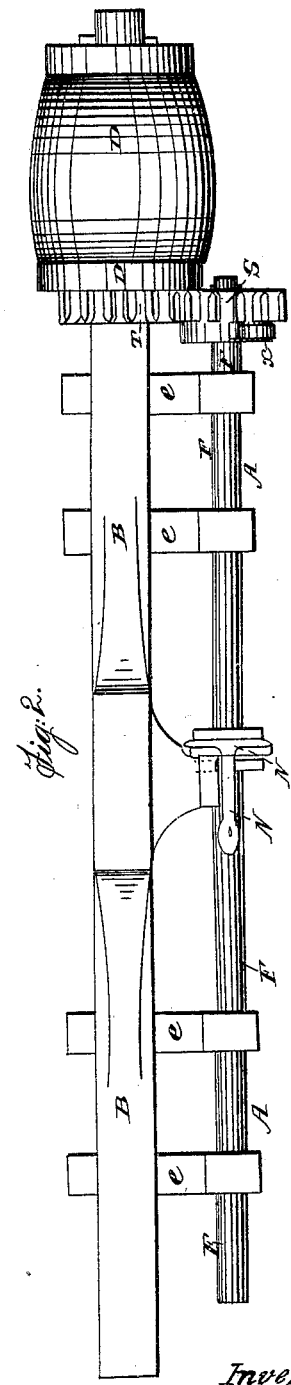
Witnesses.
Isaac A. Brunell
Francis A. Daniels
Inventor:
James M. Whiting

United States Patent Office.

JAMES M. WHITING, OF PROVIDENCE, RHODE ISLAND.

Letters Patent No. 63,344, dated March 26, 1867.

---

IMPROVEMENT IN DEVICE FOR HOLDING HORSES.

---

The Schedule referred to in these Letters Patent and making part of the same.

---

TO ALL WHOM IT MAY CONCERN:

Be it known that I, JAMES M. WHITING, of Providence, in the county of Providence, and State of Rhode Island, have invented certain new and useful Apparatus for Holding Horses from Starting; and I do hereby declare that the following is a full and exact description of the same, reference being had to the accompanying drawings, making part of this specification, in which—

Figure 1 is a view of a horse harnessed to a carriage, with my improved apparatus, as applied, to restrain the horse from starting.

Figure 2, a plan of the portion of the apparatus by which the force is exerted to hold the horse.

Figures 3 and 4 are details.

Similar letters refer to like parts in the different figures.

My invention relates to the employment of certain mechanical means to hold or restrain the forward movement of a horse and carriage by the revolution of the wheels of the latter; and consists in combining and arranging with the wheel of a carriage an apparatus that is connected by a line or pair of lines to the bits in the horse's mouth, so that when the horse starts forward the revolution of the wheel will cause the apparatus to draw on the lines and pull the animal up in the same manner as is practised with the reins in driving.

The apparatus, as represented, consists of a windlass, F, fig. 2, secured by brackets $e$ to the front axle B of a carriage, and connected and revolved by a pair of spur-gears, S T, one on the windlass and the other on the inner end of the wheel hub D, and the windlass is made to slide endwise in the brackets, so that by means of a shipper-lever, N, projecting upwards in front of the dash-board F of the carriage, the gear S of the windlass may be thrown out of gear with the gear T of the hub while the carriage is in motion, and thrown into gear when the horse and carriage stop for any purpose which would call for hitching the animal in the usual way for the purpose of pulling up and restraining the horse from moving off or running away.

This windlass, by revolving in the manner described, winds up a pair of lines, $a$, of stout cord or straps of leather at A A, and these lines trail along the thills $h$ by running the same through suitable eyes or loops thereon, and pass directly to the ring on each side of the bits, where the ends are secured; and being thus arranged the forward movement of the horse and carriage but a very slight distance will so wind up the lines on the windlass as to pull up the horse and arrest his progress. It usually happens that horses when thus pulled up will begin to back and continue to do so until they are urged or driven forward, and I have therefore made suitable provision for this action by making the backward movement of the carriage disconnect the carriage wheel from the windlass so far, at least, as to make the winding movement of the latter cease in consequence. This is effected by means of a ratchet, R, fig. 4, that is made fast to the windlass, and a pawl, $x$, for combining the movement of the gear S with the ratchet in one direction, and forming an escapement when turned in the opposite direction, that is, when the carriage moves forward the pawl engages with the ratchet and the gear and pawl move with the windlass, and when the carriage moves backward the motion of the gear S is reversed, and it moves independently of the ratchet and windlass, which remain at rest.

Having thus described my invention I would remark that the apparatus may be considerably modified in its construction and arrangement without changing its character or mode of operation.

What I claim is—

1. Combining with the wheel of a carriage a hitching apparatus arranged in such manner that the winding up or shortening of the reins or other checking device shall take place only during the forward movement of the wheel, the said apparatus being disconnected from the driving-gear during the backward movement of the carriage, substantially as shown and set forth.

2. The combination, with the windlass, provided with a ratchet-wheel, as described, of a driving-pinion loosely mounted upon said shaft, and carrying a pawl engaging with the said ratchet-wheel, under such an arrangement that the said shaft shall be disconnected from the driving-gear during the backward movement of the carriage, as set forth.

In testimony whereof I have hereunto set my hand this twenty-fourth day of January, A D. 1866.

JAMES M. WHITING.

Witnesses:
   ISAAC A. BROWNELL,
   FRANCIS A. DANIELS.